(12) United States Patent
Dal Prá

(10) Patent No.: US 8,707,823 B2
(45) Date of Patent: Apr. 29, 2014

(54) BICYCLE COMPONENT AND METHOD FOR MAKING SUCH A COMPONENT

(75) Inventor: Giuseppe Dal Prá, Zane (IT)

(73) Assignee: Campagnolo S.R.L., Vicenza (IT)

( * ) Notice: Subject to any disclaimer, the term of this patent is extended or adjusted under 35 U.S.C. 154(b) by 45 days.

(21) Appl. No.: 12/552,823

(22) Filed: Sep. 2, 2009

(65) Prior Publication Data
US 2010/0058889 A1 Mar. 11, 2010

Related U.S. Application Data

(63) Continuation of application No. 10/863,567, filed on Jun. 8, 2004, now Pat. No. 7,610,832.

(30) Foreign Application Priority Data

Jun. 10, 2003 (EP) .................................. 03425367

(51) Int. Cl.
B62M 3/00 (2006.01)
(52) U.S. Cl.
USPC ........................................................ 74/594.1
(58) Field of Classification Search
USPC .............. 74/594.1–594.7; 411/393, 395, 402, 411/412
See application file for complete search history.

(56) References Cited

U.S. PATENT DOCUMENTS

| 558,557 | A | * | 4/1896 | Hall | 74/594.4 |
|---|---|---|---|---|---|
| 1,254,610 | A | * | 1/1918 | Ledig | 74/594.4 |
| 3,080,893 | A | | 3/1963 | Craycraft | |
| 4,237,948 | A | * | 12/1980 | Jones et al. | 411/307 |
| 4,339,490 | A | | 7/1982 | Tada et al. | |
| 4,414,860 | A | | 11/1983 | Brunsch et al. | |
| 4,657,795 | A | | 4/1987 | Foret | |
| 4,671,336 | A | | 6/1987 | Anahara et al. | |
| 4,811,626 | A | | 3/1989 | Bezin | |
| 4,856,801 | A | | 8/1989 | Hollingsworth | |
| 5,215,322 | A | | 6/1993 | Enders | |
| 5,271,784 | A | | 12/1993 | Wu et al. | |
| 5,435,869 | A | | 7/1995 | Christensen | |
| 5,440,950 | A | * | 8/1995 | Tranvoiz | 74/594.4 |
| 5,624,519 | A | | 4/1997 | Nelson et al. | |
| 5,632,940 | A | | 5/1997 | Whatley | |
| 5,667,857 | A | | 9/1997 | Watanabe et al. | |
| 5,851,459 | A | | 12/1998 | Chen | |

(Continued)

FOREIGN PATENT DOCUMENTS

CN 2278644 Y 4/1998
CN 1186917 7/1998

(Continued)

OTHER PUBLICATIONS

European Search Report dated Oct. 15, 2009, European Application No. 09009915.1-1254.

(Continued)

Primary Examiner — Vicky Johnson
(74) Attorney, Agent, or Firm — Volpe and Koenig, P.C.

(57) ABSTRACT

A pedal crank for a bicycle comprising structural fibers incorporated in a matrix of polymeric material which has two seats in which two metal inserts are received. The seats have a mouth which opens onto the outer surface of the pedal crank and have a geometry such as to allow the insertion of the inserts from outside of the pedal crank.

18 Claims, 7 Drawing Sheets

(56) References Cited

U.S. PATENT DOCUMENTS

| | | | |
|---|---|---|---|
| 5,941,135 A * | 8/1999 | Schlanger | 74/594.1 |
| 6,276,884 B1 | 8/2001 | Bueter | |
| 6,305,243 B1 | 10/2001 | Chiang | |
| 6,324,940 B1 | 12/2001 | Pazdirek et al. | |
| 6,443,033 B1 | 9/2002 | Brummer et al. | |
| 6,564,675 B1 | 5/2003 | Jiang | |
| 6,924,021 B1 | 8/2005 | Colegrove et al. | |
| 7,000,499 B2 | 2/2006 | Valle | |
| 7,013,753 B2 | 3/2006 | Valle | |
| 7,070,376 B1 * | 7/2006 | Toback | 411/82.2 |
| 2003/0037638 A1 * | 2/2003 | Dal Pra' | 74/594.1 |
| 2003/0061900 A1 | 4/2003 | Smith | |
| 2003/0087572 A1 | 5/2003 | Balthes et al. | |
| 2004/0149076 A1 | 8/2004 | Yamanaka | |
| 2004/0177717 A1 | 9/2004 | Chiang | |
| 2005/0012298 A1 | 1/2005 | Dal Pra et al. | |
| 2005/0016323 A1 | 1/2005 | Dal Pra' | |
| 2007/0186719 A1 | 8/2007 | Ciavatta et al. | |
| 2007/0199403 A1 | 8/2007 | Ciavatta | |
| 2007/0227293 A1 | 10/2007 | Valle | |
| 2010/0058889 A1 | 3/2010 | Dal Prà | |

FOREIGN PATENT DOCUMENTS

| | | | | |
|---|---|---|---|---|
| CN | 2509074 Y | | 9/2002 | |
| DE | 4342891 A1 * | | 5/1994 | B62M 1/02 |
| DE | 29600548 U1 | | 2/1996 | |
| DE | 19601125 A1 * | | 7/1997 | B62M 3/00 |
| EP | 0177736 | | 4/1986 | |
| EP | 0916477 | | 5/1999 | |
| EP | 1419961 A1 | | 11/2002 | |
| EP | 1270393 | | 1/2003 | |
| EP | 1270394 | | 1/2003 | |
| EP | 1281609 | | 2/2003 | |
| EP | 1281609 A2 | | 2/2003 | |
| EP | 1281609 A3 | | 10/2003 | |
| EP | 1442974 A2 | | 8/2004 | |
| EP | 1486413 A2 | | 12/2004 | |
| FR | 2416829 | | 9/1979 | |
| FR | 2636386 | | 3/1990 | |
| FR | 2722753 | | 7/1994 | |
| FR | 2722753 | | 1/1996 | |
| JP | 55-099991 | | 7/1980 | |
| JP | 57-111694 | | 7/1982 | |
| JP | 60-022323 | | 2/1985 | |
| JP | 61-066636 | | 4/1986 | |
| JP | 61-135801 | | 6/1986 | |
| JP | 61-137634 | | 6/1986 | |
| JP | 04-339635 | | 11/1992 | |
| JP | 04-347006 | | 12/1992 | |
| JP | 06-321167 | | 11/1994 | |
| JP | 06321167 A * | | 11/1994 | B62M 3/00 |
| JP | 08082189 A | | 3/1996 | |
| JP | 08267374 A | | 10/1996 | |
| JP | 10-061638 | | 3/1998 | |
| JP | 10-181662 | | 7/1998 | |
| JP | 11-166552 | | 6/1999 | |
| JP | 11351519 A | | 12/1999 | |
| JP | 2001506358 A | | 5/2001 | |
| JP | 2003-054478 | | 2/2003 | |
| JP | 2003-072666 | | 3/2003 | |
| JP | 2003-276671 | | 10/2003 | |
| JP | 2006-007799 | | 1/2006 | |
| WO | 98/57840 | | 12/1998 | |
| WO | 02-32751 A2 | | 4/2002 | |

OTHER PUBLICATIONS

English translation of Dec. 21, 2010 Office Action issued in corresponding Japanese Appln. No. 2004-173152.
Office Action for JP 2004-173152 issued Jan. 5, 2010.
European Search Report dated Sep. 17, 2009, European Application No. 09009916.9-1254.
European Search Report dated Oct. 15, 2009, European Application No. 09009915.7-1254.
EPO Communication dated Oct. 10, 2008.
EPO Communication dated Oct. 4, 2011.
Japanese Office Action and English translation for Appln. No. 2007-031919—dated Feb. 28, 2012.
Japanese Office Action and English translation for App. No. 2010-259926—dated Jul. 3, 2012.
Japanese Office Action and English translation for JP App. No. 2010-259926—dated Jun. 19, 2013.

* cited by examiner

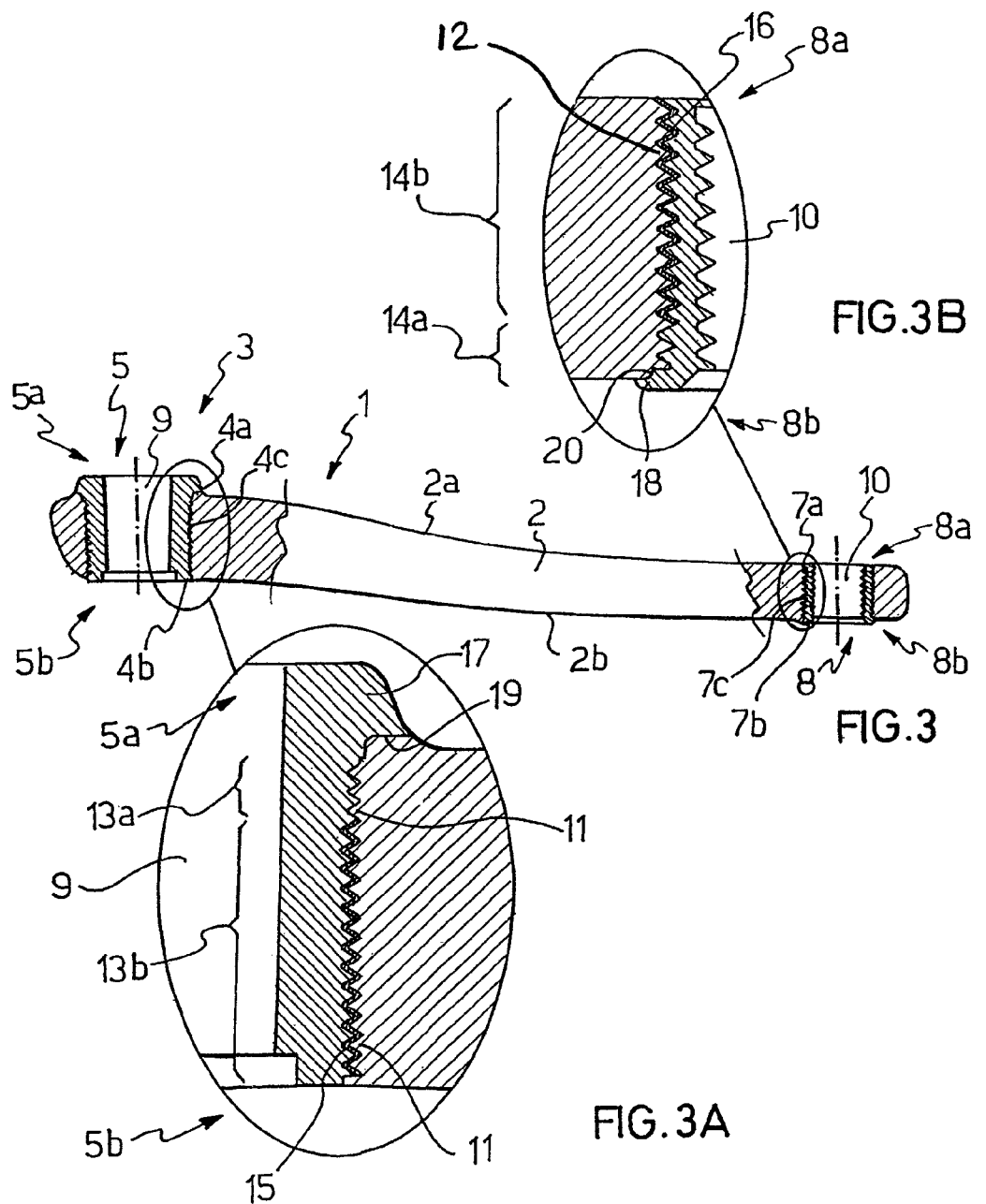

BICYCLE COMPONENT AND METHOD FOR MAKING SUCH A COMPONENT

CROSS REFERENCE TO RELATED APPLICATION

This application is a continuation of U.S. patent application Ser. No. 10/863,567, filed Jun. 8, 2004, which is incorporated by reference as if fully set forth.

BACKGROUND

The prior art shows different types of pedal cranks made with different shapes, materials and constructive techniques. Each of these has the same goals: reduce the weight as much as possible and at the same time ensure, if not even improve, the characteristics of strength and reliability of the pedal crank.

The goal of manufacturing lighter pedal cranks has led to the use of composite materials having low specific weight. Nevertheless, while the pressures occurring in the use of the pedal crank remain unaltered, specifically the torsion forces due to the thrusting action of the cyclist during pedaling, it becomes necessary to insert metal elements that act as an interface between the bottom bracket pivot, or pedal pivot, with the pedal crank body.

One lighter pedal crank is shown in EP 1 281 609 assigned to Campagnolo S.r.l., wherein the pedal crank body is obtained by molding a thermosetting composite material inside a mould in which metal inserts are arranged. During the molding step, the composite material in plastic state is arranged to cover the inserts, coating them for most of their outer surface, except for a short portion in correspondence with support elements to which the inserts are fixed. Such support elements advantageously act as extractor elements. The material thus arranged inside the mould is heated up to its hardening after which the pedal crank can be removed from the mould by activating the extractor elements. The pedal crank then undergoes cooling down to room temperature. In the end configuration the inserts are substantially incorporated inside the material with which the pedal crank body is made.

During the aforementioned cooling step, however, the problem is that the composite material coats the insert and tends to detach from the walls of the insert itself. During cooling, both the insert's metal material and the pedal crank's composite material shrink. The detachment process is even more critical when the cooling coefficient of the two materials is different. Such a detachment means a decrease in adherence between the metal insert and the composite material, with a consequent decrease in the strength properties and the breaking strength of the pedal crank as a whole.

A second solution which uses metal inserts in a pedal crank body of composite material is shown in U.S. Pat. No. 6,202,506 B1. In such a solution the metal insert has, on the outer surface, a series of shaped discs which are spaced apart and incorporated in the composite material of which the pedal crank body is made. Such a manufacture, while increasing the contact surface between insert and composite material, is still problematic due to the partial detachment between the material of the pedal crank body and the insert, this being a phenomenon which appears during the hardening step of the material.

SUMMARY

The present invention seeks to overcome the problems discussed above and improve bicycle parts as a whole. A bicycle component comprising a body made from structural fibers incorporated in a matrix of polymeric material comprises at least one seat, an opening, at least one metal insert that engages the seat. The opening comprises a mouth at a first end of the opening; a base at a second end of the opening opposite the first end being of a size not greater than the size of the mouth end; and walls with cross-sections that do not increase from the mouth to the base. The body is adapted to mechanically couple with at least one element of the bicycle to transmit force.

BRIEF DESCRIPTION OF THE DRAWING(S)

Further characteristics and advantages of the invention shall become clearer from the Detailed Description which makes reference to the following Figures.

FIG. 3 is a partial section view of FIG. 1 along the axis III°-III° of FIG. 1.

FIG. 3A is an enlarged detail of FIG. 3.

FIG. 3B is another enlarged detail of FIG. 3.

DETAILED DESCRIPTION OF THE PREFERRED EMBODIMENT(S)

Figure 1:
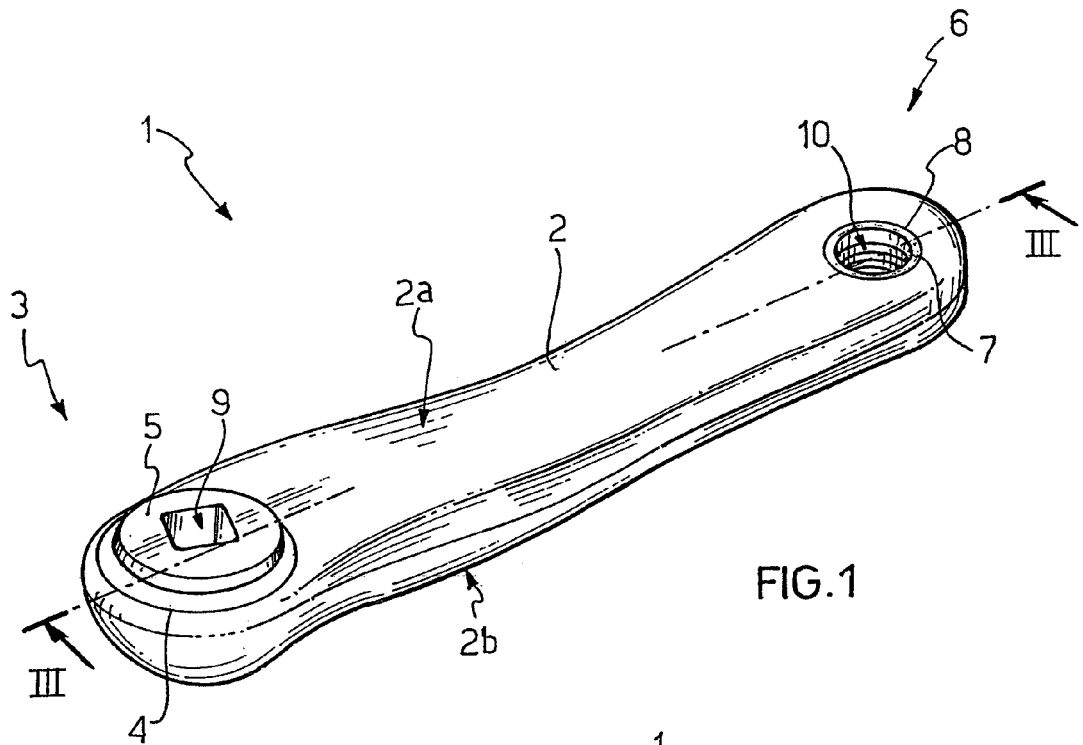
FIG. 1 is an isometric view of the component according to the invention.
Figure 2:
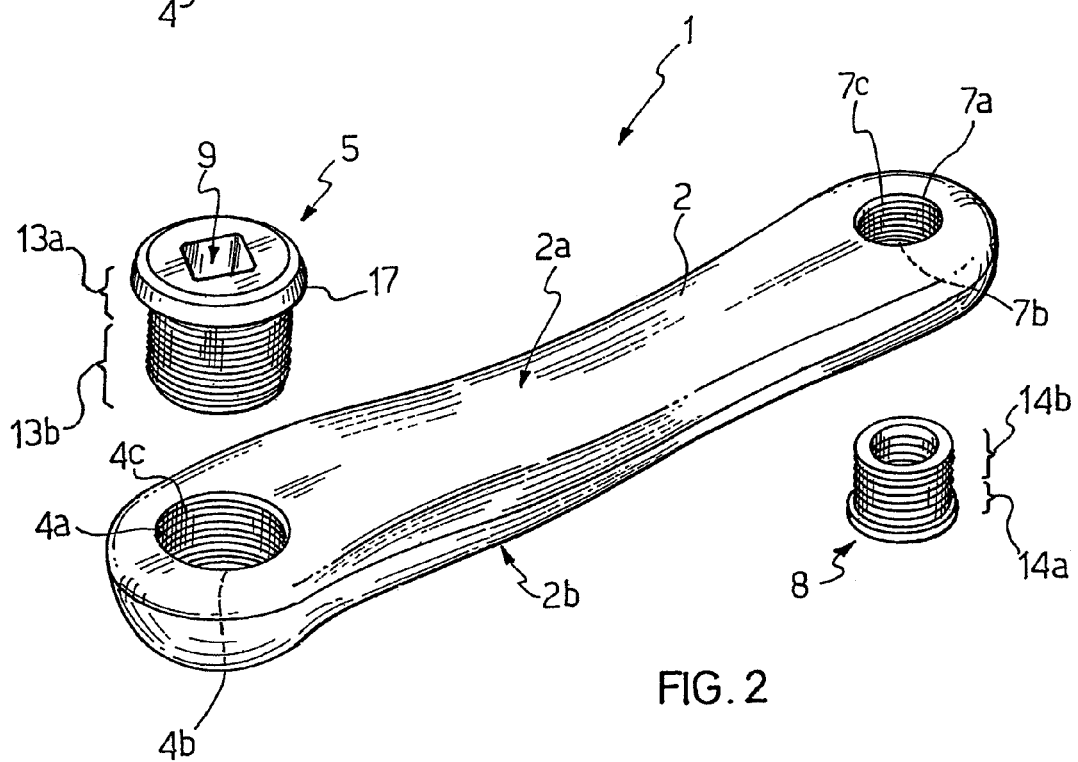
FIG. 2 is an exploded view of FIG. 1.

In FIGS. 1 to 3, the component 1 comprises a pedal crank for bicycles. The term pedal crank as used herein is general and generally should be understood to mean a bicycle component with characteristics similar to those of a pedal crank, like for example a saddle post, fork, handlebars, gearshift, or brakeshift. In general, it can be considered that such a component is subjected to at least one force component, for example traction, compression and/or torsion, and is able to transmit or else withstand such a force.

The pedal crank comprises an elongated body 2 which has, at the end 3, a first seat 4 where a first metal insert 5 is received for the attachment of the pedal crank 1 to the bottom bracket pivot of the bicycle (pedal not shown). At the opposite end 6 there is a second seat 7 where a second metal insert 8 is received for the connection of a pedal (not shown).

The two inserts 5, 8 have throughholes 9, 10 for the connection, respectively, to the bottom bracket pivot and to the pedal pivot. The through hole 9 is square for the connection to the bottom bracket pivot whereas the through hole 10 is threaded for the connection to the threaded pedal pivot. It should be clear that in different embodiments the connection holes may not be throughholes and may have a different geometric profile, matching the shape of bottom bracket and pedal pivots.

The body 2 is made from structural fibers incorporated in a thermoplastic or thermosetting resin matrix, whereas the inserts 5, 8 are metal material and preferably an aluminum alloy. The structural fibers are preferably, but not necessarily, carbon fibers arranged in a random manner inside the matrix. Alternatively, the structural fibers can be arranged in an ordered way inside the mold, for example according to a unidirectional configuration. For example, the fibers may be aligned in one direction near areas under high stress. Alternately, the fibers may be weaved in the form of fabric, to create layers with desired characteristics along particular directions. The structural fibers can finally be chosen from the group comprising glass fibers, aramidic fibers, ceramic fibers or any combination thereof.

As can be seen in FIGS. 2, 3, 3A and 3B, each seat 4, 7 has a mouth 4a, 7b which opens onto the surface 2a, 2b of the body 2 of the pedal crank 1, a base 4b, 7a and walls 4c, 7c. The shape of such seats 4, 7 is substantially cylindrical therefore the size of the mouths 4a, 7b is substantially equal to the size of the respective bases 4b, 7a, whereas the walls 4c, 7c define, from the mouth 4a, 7b to the base 4b, 7a, identical circular sections. Each seat 4, 7 has respective mouth openings 5a, 8b and respective base openings 5b, 8a.

The seat 4, 7 and the insert 5, 8 have matching cylindrical coupling surfaces, on which respective threadings are formed. The seat 4, 7 is a threaded hole 11, 12 whereas the insert 5, 8 has a portion thereof 13, 14 shaped like a screw.

The insert has a first coupling zone 13a with contact threads that have an average, outer and core diameter greater than those of the threads of the second zone 13b, as is best seen in FIG. 3A. The threaded portion 13 of the insert 5 has a first coupling zone 13a without clearance with the threaded hole 11 and a second coupling zone 13b that has clearance between its threads and those of the threaded hole 11. This clearance defines an interspace zone 15. Such an interspace 15 has a substantially uniform thickness, advantageously between 0.1 and 0.05 mm, and is filled with gluing substance to secure the insert 5 within the seat 4.

The insert 5 also has a widened head portion 17 that abuts against the circular contact surface 19 formed in the main body 2. The insert 5 also has a square through hole 9 for coupling with a bottom bracket pivot.

FIG. 3B shows the opposite end of the body 2 from that shown in FIG. 3A. At this end, the insert 8 is adapted to connect to the pedal pivot (not shown). The insert 8 has a first coupling zone 14a without clearance that consists of three contact threads which have an average, outer and core diameter that are greater than those of the threads of the second zone 14b. Similar to the mating engagement of the insert 5 and the threaded hole 11, the screw shaped portion 14 of the insert 8 has a first coupling zone 14a without clearance with the threaded hole 12 and a second coupling zone 14b that has clearance between the threads of the threaded hole 12. This clearance defines an interspace zone 16. The interspace 16 has a substantially uniform thickness, advantageously between 0.1 and 0.05 mm, and is filled with gluing substance.

The insert 8 also has a widened head portion 18 that abuts against the circular contact surface 20 formed in the main body 2. The insert 8 also has a threaded through hole 10 for coupling with the pedal pivot.

It should be noted that the two inserts 5, 8 are screwed into the body 2 of the pedal crank 1 on its opposite surfaces 2a, 2b preferably screwed in with a counter-clockwise motion. This counter-clockwise threading facilitates an advantageous twisting screwing action of the inserts 5, 8 into the respective seats 4, 7 during pedaling.

Figure 3C:
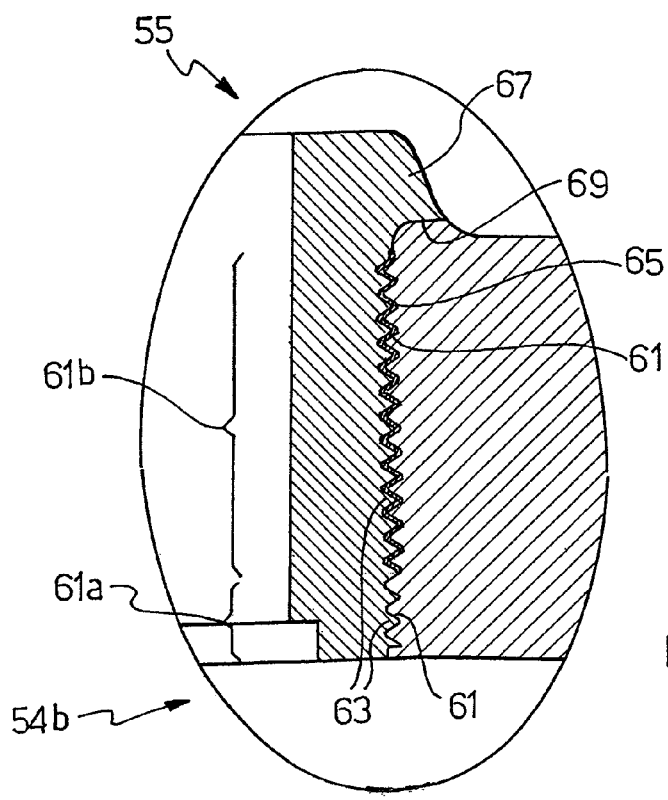
FIG. 3C is an alternate variant embodiment of the detail of FIG. 3A.

FIG. 3C shows an alternate embodiment of the screw-threaded hole type coupling between an insert and seat. This embodiment differs from the previous one in that the threaded hole 61 has a first coupling zone 61a without clearance with the threaded portion 63 of the insert 55, and a second coupling zone 61b spaced apart from the screw 63 that defines an interspace 65. The first zone 61a consists of three contact threads which have an average, outer and core diameter that are smaller than those of the threads of the second zone 61b. The first zone 61a is near to the base 54b of the seat 54. The insert 55 also has a widened head portion 67 that abuts against the contact surface 69 formed in the main body 2.

Figure 4:
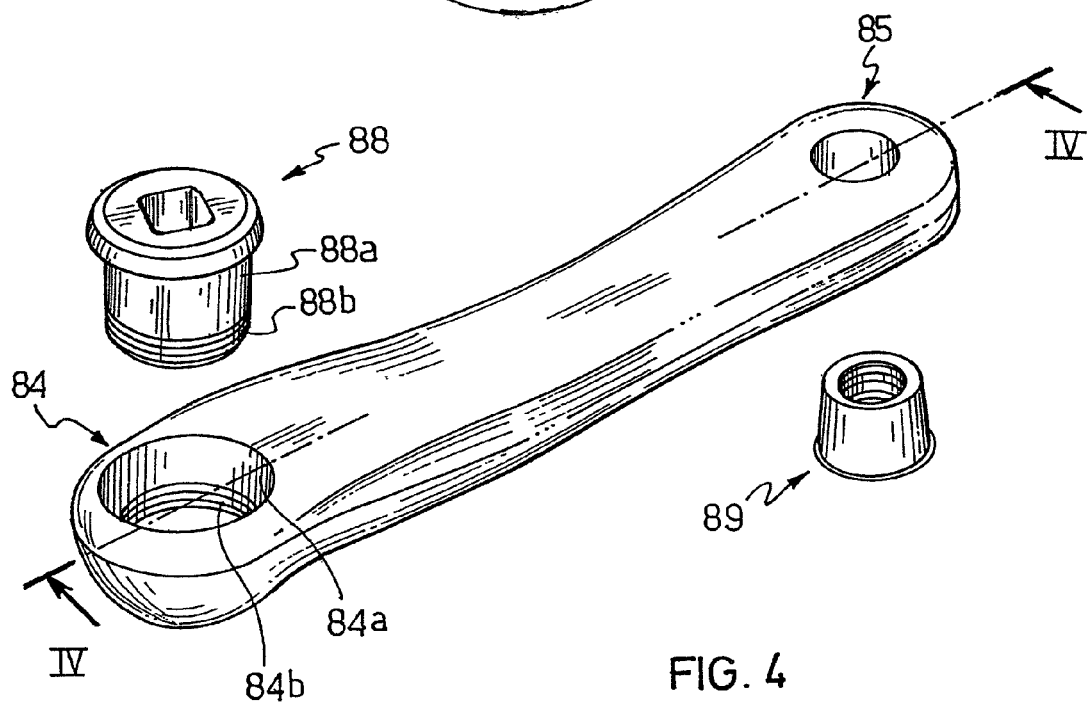
FIG. 4 is an exploded isometric view of a variant of the component of the invention.
Figure 5:
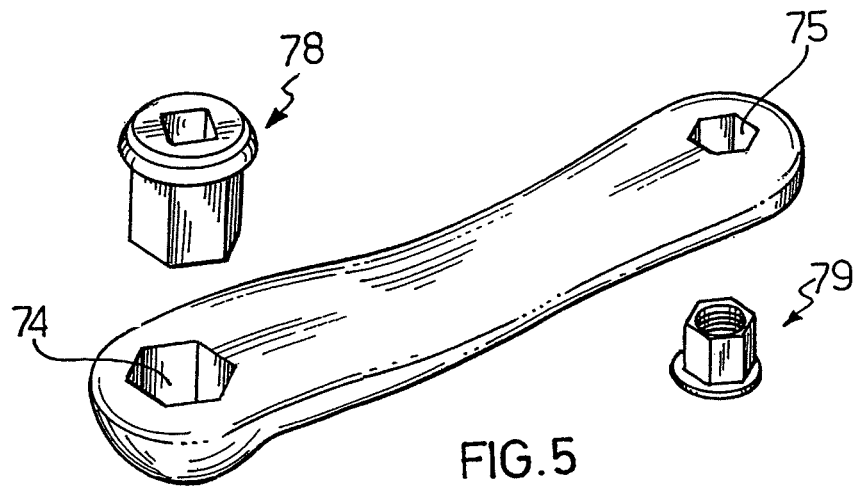
FIGS. 5 and 6 represent exploded isometric views of further variants of the component of the invention.
Figure 6:
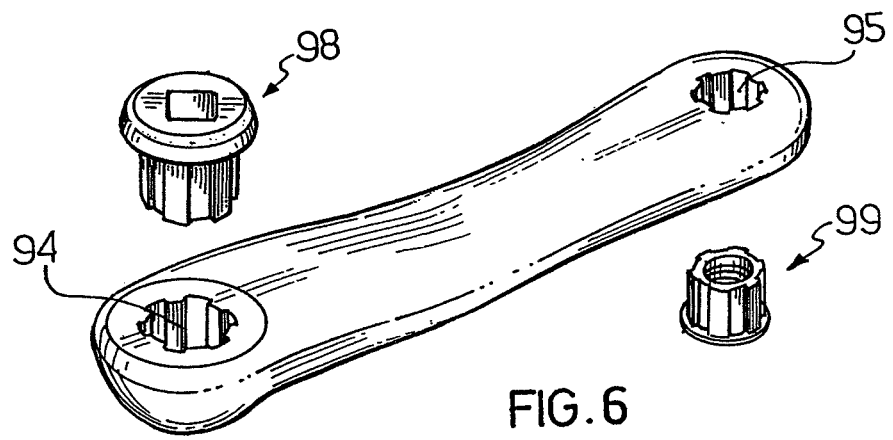

FIGS. 4, 5 and 6 represent different variants of the pedal crank described and differ from it in that the seat and the insert have different external profiles, which all have an interspace for receiving gluing substances.

Figures 4A, 4B, 4C:
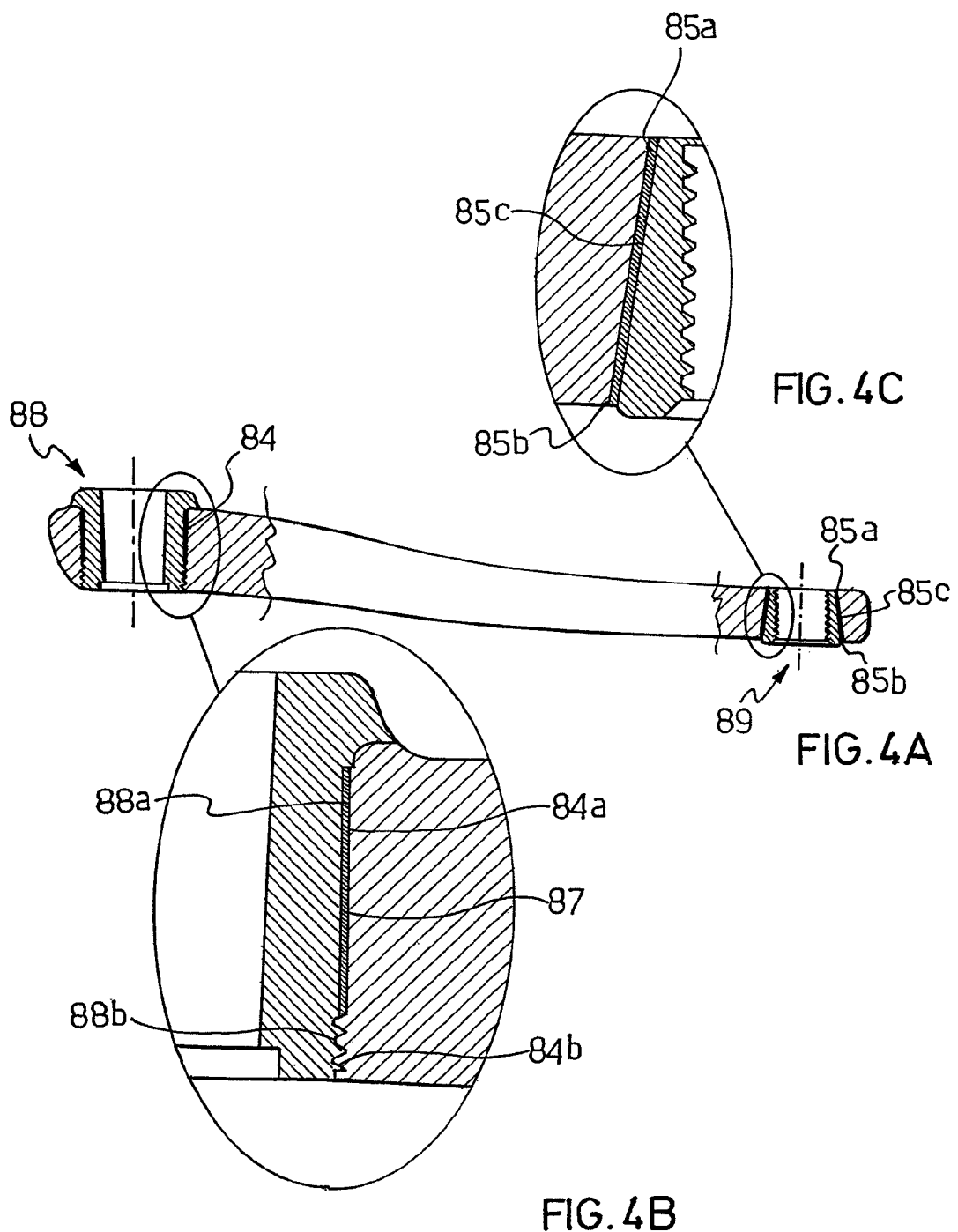
FIG. 4A is a partial section view along the axis IV°-IV° of FIG. 4.
FIG. 4B is an enlarged detail of FIG. 4A.
FIG. 4C is another enlarged detail of FIG. 4A.

FIG. 4 shows a pedal crank with the insert 88 and the respective seat 84 associated with the central movement that is different from the insert 89 and the respective seat 85 associated with the pedal. This difference is best seen in FIG. 4B and 4C. In FIG. 4B, the seat 84 has a first cylindrical portion 84a and a threaded end portion 84b. The associated insert 88, has a threaded portion 88b which couples with the threaded portion 84b of the seat 84 and a cylindrical portion 88a with a slightly smaller diameter than the diameter of the cylindrical portion 84a of the seat 84. This defines an interspace zone 87 where the gluing substance is advantageously received.

By contrast, the seat 85 and its associated insert 89 have a slightly tapered cylindrical shape as shown in FIG. 4C. The base 85a of the seat 85 is smaller in size than the mouth 85b, whereas the walls 85c define sections whose size decrease from the mouth 85b to the base 85a.

FIG. 5 shows a pedal crank 72 with a seat 74, 75 and associated tapered inserts 78, 79 that have a hexagonal section.

FIG. 6 shows a pedal crank 92 in which each seat 94, 95 and the associated insert 98, 99 are cylindrically shaped with the contact surfaces grooved longitudinally to improve the torsional hold of the insert 98, 99 within the seat 94, 95.

It should be noted that the different geometry of the inserts and of the seats gives a different distribution of the forces, especially of the torsional type, during pedaling. During the design process, the goal of this is to design the profiles so as to suitably distribute the mechanical stresses between the body of the pedal crank and the insert to minimize the shearing stress placed on the gluing substance between them.

Figure 7:
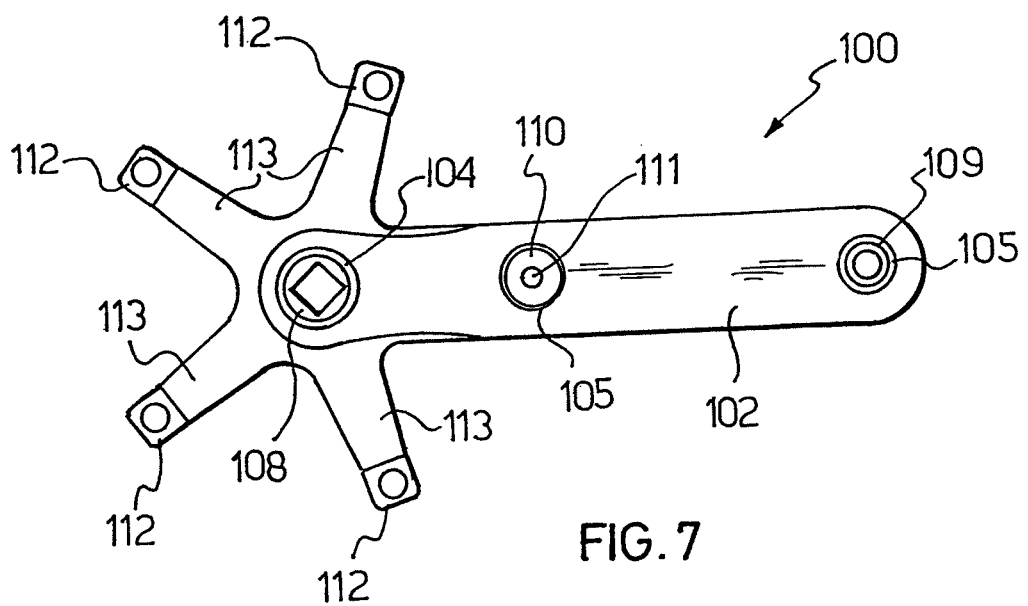
FIG. 7 represents an isometric view of another variant embodiment of the component of the invention.

FIG. 7 represents a variant of the pedal crank of FIG. 1 and consists of a pedal crank 102 with spokes 100, commonly known as right pedal crank, with which one or more crowns (not represented) are associated to drive the chain.

In the embodiment shown in FIG. 7, the pedal crank body 102 has, at one end, a first seat 104 where a first insert 108 is received for the connection to the center of the crank and at the opposite end, a second seat 105 where a second insert 109 is received for the connection to a pedal. The first and second insert 108, 109 are preferably, but not necessarily, of the type described in FIG. 1.

The pedal crank body 102 also comprises a third seat 115 and a third insert 110, of the same type as those described in the previous Figures, arranged in an intermediate position between the first insert 108 and the second insert 109. The third seat 115 and the third insert 110 are used for the anchoring of the crown which is mounted integral to the pedal crank 100. For such a purpose a blind threaded hole 111 attaches to the crown is formed on the third insert 110.

The pedal crank 100 also has, at one end, four arms 113, or spokes, at the ends of which respective seats 112 are formed which allow the locking of the crown at the four points preferably using a threaded screw or bolt. Preferably, the arms 113 and the pedal crank body 102 constitute a single body made of structural fibers incorporated in a matrix of polymeric material, for example a thermosetting or thermoplastic resin.

In another embodiment, the seats 112 can be of a size and shape to receive respective metal inserts, of the type described above, in such a case to define four anchoring points for the crown to the pedal crank body 102 with metal inserts.

In other embodiments which have neither been described nor represented, the pedal crank could be equipped with seats with different geometries, for example any combination of the shapes shown in FIGS. 4 to 6.

In other embodiments, the insert itself could be of a different shape with respect to the seat in which it is received, for example providing a triangular shaped tapered insert received in any non-cylindrical shaped seat.

In another embodiment, the insert-seat coupling could be made without the interposition of gluing substance, in such a case the hold being ensured only by the mechanical interference between the two parts. Furthermore, the seat could be blind and not engage the body for its entire length like for the shapes illustrated above. Or the seat could engage the threaded hole and leave no interspace zone.

Figure 8:
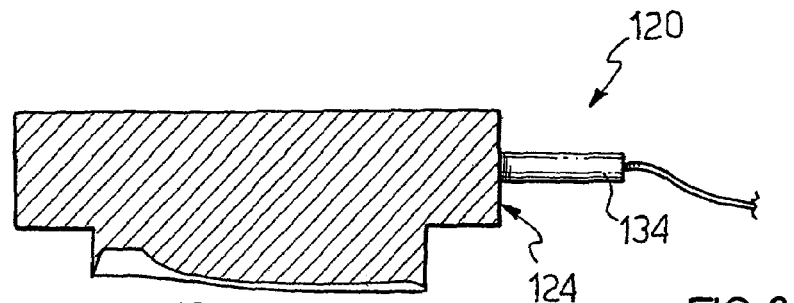
FIGS. 8 to 11 represent the different steps for making the component of FIG. 1 according to a preferred embodiment of the method of the invention.
Figure 9:
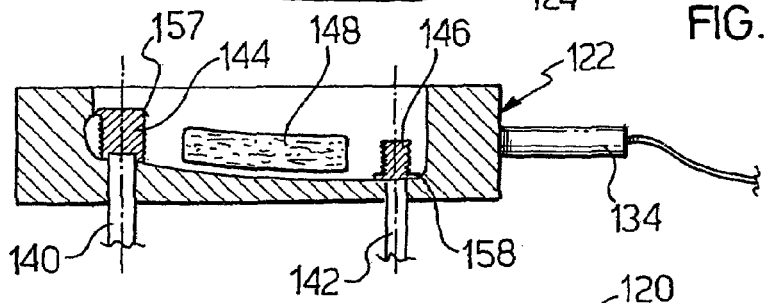

FIGS. 8 to 11 show the steps for obtaining a pedal crank of the type described and represented in FIG. 1, and according to another embodiment. As shown in FIG. 8, a predetermined amount of polymeric material incorporating structural fibers 148 is arranged inside a first half 122 of a mold 120. Inside such a first half 122, two master elements 144, 146 are coated with a detachment-enhancing substance and kept in position by two support elements 140, 142, which also act as extractor elements. The master elements 144, 146 are threaded inserts equipped with a widened head 157, 158 with a profile that mirrors the shape of the seats 4, 5 to be obtained in the pedal crank 1.

Figure 12:
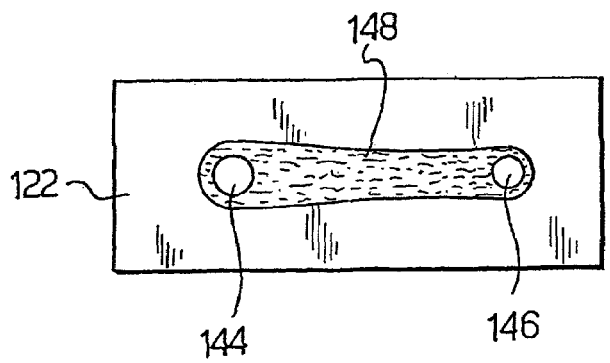
FIG. 12 represents a view according to the section line XII-XII of FIG. 9.
Figure 10:
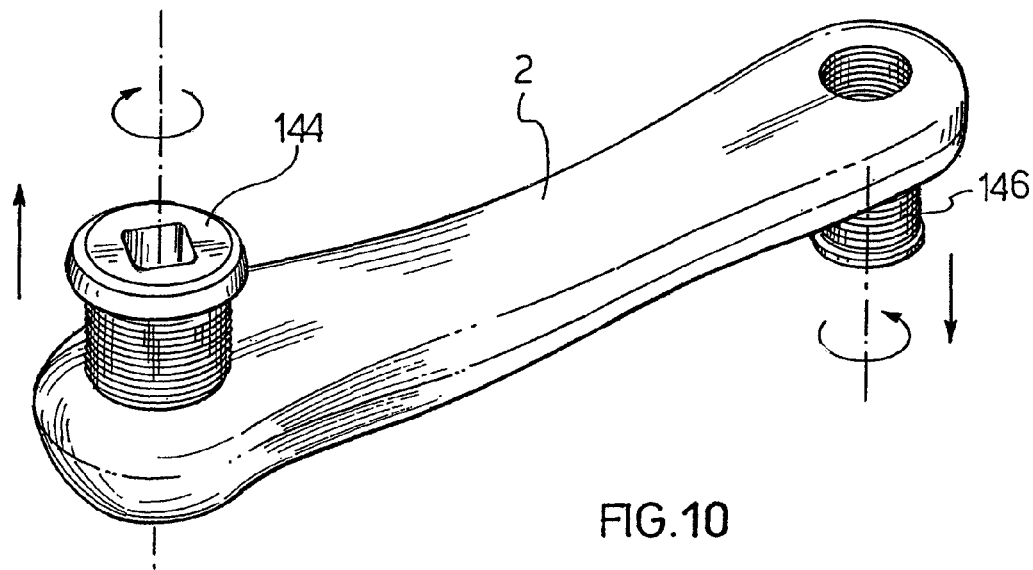

In the subsequent step, the second half 124 of the mould 120 is closed on the first half 122, making the material 148 flow inside the recess defined by the two halves 122, 124 of the mould 120. The material 148 in plastic state completely fills the cavity and completely surrounds the master elements 144, 146, as it can be seen in FIG. 12, with the exception of the widened heads 157, 158 which, the top of which are not coated with any material.

The subsequent heating of the mold 120, through suitable known heating means 134, allows the hardening and the reticulation of the polymeric material and the relative shaping of the pedal crank body 2 according to the desired shape.

The mold 120 is then opened and the pedal crank body 2 is removed by means of the extractor elements 140, 142. The master elements 144, 146, as stated, have the widened heads 157, 158 not coated with material. This facilitates their easy removal from the pedal crank body 2 through an unscrewing operation. The removal is also helped by the presence of the detachment-enhancing material with which the master elements 144, 146 had been coated before molding as well as by a partial detachment of the material 148 due to the heat shrinking of the materials in the cooling step. The removal of the master elements 144, 146 creates a semi-worked product comprising a pedal crank body 2 made totally from set material formed from structural fibers with two threaded seats 4, 5.

Figure 11:
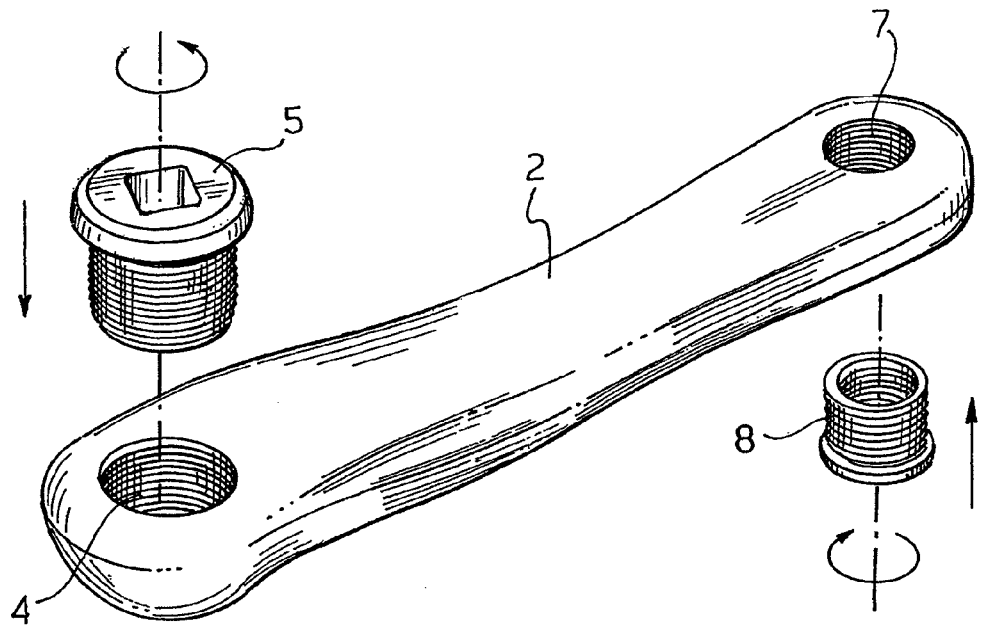

FIG. 11 shows the next steps: first, coating the inserts 5,8 with a layer of gluing substance, preferably a bicomponent epoxy resin and second, inserting the respective threaded inserts 5, 8 (the inserts have the geometry shown in FIGS. 3A and 3B). When the insert is screwed in, the gluing substance fills the interspace 15, 16 defined between the seat 4, 7 and the insert 5, 8. The threads closest the head of the insert firmly engage the insert 5, 8 in the seat 4, 7 due to the coupling without clearance made by the contact threads 13a, 14a with the threaded hole 11, 12.

The next step is drying the gluing substance, which can take place at room temperature or possibly through heating, until the glue polymerizes.

The final step involves making suitable holes 9, 10 in the inserts 5, 8 for connection to the bottom bracket pivot and to the pedal according to known processing techniques with machine tools.

Advantageously, the described method allows the cohesive force between the inserts and the pedal crank body to be improved thanks to their particular geometry. The inserts are preferably inserted into the seats when they are already formed, with the polymeric material already reticulated and hardened, which allows for an ideal interference coupling.

Another advantage is that the described method allows the cohesive force between the inserts and the pedal crank body to be improved through the use of the glue. The glue is preferably applied and left to dry when the pedal crank body and the inserts are already formed. They do not, therefore, undergo any shrinkage during the polymerization of the glue.

Variants of such a method foresee the use of different shaped master elements, i.e. shaped so as to allow the manufacture of the respective seats according to the desired geometries. The manufacture of the seat 61 represented in FIG. 3B, for example, could comprise a master element having a cylindrical element with variable profile threading according to the profile shown in the Figure.

It can also be foreseen that in a further step of the described method, after the insert is inserted in the respective seat, the end opposite the widened head undergoes a drawing operation to create an undercut zone which prevents the insert from coming out from the seat itself.

In another variant of the described method, the seats could be formed by processing with machine tools starting from a monolithic pedal crank body obtained, for example, through molding with the described method, in which, however, the master elements are missing.

In a further variant the molding could foresee the use of layers of material suitably arranged inside the mould for shaping the pedal crank. Such layers can consist of structural fibers arranged according to a unidirectional configuration, or else wefted in the form of fabric, inside the matrix of polymeric material. This allows particular physical-mechanical characteristics of the pedal crank to be obtained along predetermined directions.

It should be noted that the shape of the master elements substantially mirrors the shape of the inserts and is slightly larger than them in at least one portion to allow, when the insertion is completed, the creation of the interspace for receiving the gluing substance.

Moreover, when the pedal crank is mounted on the bicycle, it can be foreseen to apply a removable covering element of the insert to improve the appearance of the pedal crank.

Finally, the shape of the seats and of the metal inserts can be any combination of the illustrated shapes. For example, all the shapes illustrated can be tapered, or else can have a first part with decreasing sections (frusto-conical or frusto-pyramidal) and an end part with constant sections (cylindrical or prismatic). Moreover, in the frusto-conical-cylindrical shape there can be a threading in the cylindrical part or in its end part. Finally, the inner surfaces of the seats and/or outer surfaces of the inserts can be made up of any combination of curved areas and flat areas.

What is claimed is:

1. A bicycle component comprising:
   a body of structural fibers randomly incorporated in a matrix of polymeric material, the body has opposed surfaces, spaced apart ends, and at least one seat that has an opening that extends between the opposed surfaces with
   a mouth at a first end of the opening; and
   a base at a second end of the opening that is not greater than the size of the mouth end; and
   walls with cross-sections that do not increase from the mouth to the base; and,
   at least one first metal insert that is received within the opening of the at least one seat and has a widened head portion that engages with a portion of the body surrounding the at least one seat opening and is dimensioned to define a gap between it and the at least one seat opening that receives an adhesive that fixes the metal insert in the at least one seat opening and renders the bicycle component suitable for mechanical coupling with at least one element of a bicycle to transmit force.

2. The component of claim 1 wherein the at least one seat and the at least one first metal insert are mechanically coupled using coupling surfaces that are prism shaped.

3. The component of claim 1 wherein the at least one seat and the at least one first metal insert each have a respective coupling surface and are mechanically coupled using the coupling surfaces and the coupling surface of the at least one first metal insert has, in at least one portion thereof, an outer thread.

4. The component of claim 1 wherein the at least one seat and the at least one first metal inert each have a respective coupling surface that is threaded and the mechanical coupling of the threaded surfaces is a threaded engagement.

5. The component of claim 1 wherein a portion of the at least one first metal insert is screw shaped and has a first coupling zone that substantially engages a threaded hole and a second coupling zone that has an interspace that is a gap between the at least one first metal insert and the threaded hole and the first coupling zone comprises one or more contact threads having a greater average, outer and core diameter with respect to threads of the second coupling zone.

6. The component of claim 1 wherein the widened head portion abuts an outer surface of the body.

7. The component of claim 1 wherein a gluing substance contacts the at least one seat and the at least one first metal insert.

8. The component of claim 7 wherein the walls of the opening of the at least one seat and an outer surface of the at least one first metal insert define an interspace suitable for receiving the gluing substance.

9. The component of claim 1 wherein the component is a pedal crank comprising: a first seat at a first end of the crank where the at least one first metal insert is received for connection to a bottom bracket of the bicycle; and a second seat at an opposite end of the crank from the first end where at least one second metal insert is received for connection to a bicycle pedal.

10. The component of claim 9 wherein the at least one first metal insert has a first connection hole to the bracket and the at least one second insert has a second connection hole to the pedal.

11. A bicycle component, comprising:
    an elongate body of composite material formed of structural fibers randomly incorporated in a matrix of polymeric material;
    at least one insert that has a widened head portion;
    at least one seat formed as an opening in the body that houses the at least one insert and the widened head portion engages with a contact surface surrounding the opening;
    and a coupling between the at least one seat and the at least one insert, the coupling comprising an outer surface of the at least one insert joined with an inner surface of the opening and having a first coupling zone wherein the outer surface and inner surface form an interference fit between the insert and the opening and a second coupling zone adjacent to the first coupling zone wherein an adhesive is interposed between the outer surface and the inner surface.

12. The component of claim 11, wherein the outer surface and the inner surface comprise opposite engaging threads and the threads of the insert have a greater average, outer, and core diameter in the first coupling zone than in the second coupling zone.

13. The component of claim 11, wherein the component is a crank arm and the at least one insert is coupled with at least one of a pedal crank or a pedal.

14. A bicycle crank arm comprising:
    a body of composite material formed of structural fibers randomly incorporated in a matrix of polymeric material;
    at least one insert that has a widened head portion and coupled with one of a pedal crank or a pedal; and
    at least one opening having an axial extension formed in the body and housing the at least one insert and the widened head portion engages with a contact surface surrounding the opening;
    wherein, a first coupling zone is defined between the body and the at least one insert along a first portion of the axial extension of the at least one opening, and a second coupling zone is defined between the body and the at least one insert along a second portion of the axial extension of the at least one opening, the body and the at least one insert being separated by a first distance in the first coupling zone, and a second distance that is greater than the first distance in the second coupling zone.

15. The crank arm of claim 14, wherein the body and the at least one insert are in contact with each other in the first coupling zone, and displaced from each other in the second coupling zone.

16. The crank arm of claim 14, wherein the insert comprises an exterior threading and the at least one opening comprises an interior threading engaged with the exterior threading.

17. The crank arm of claim 14, further comprising an adhesive interposed between the insert and the at least one opening.

18. A bicycle component comprising:
    a body made from structural fibers randomly incorporated in a matrix of polymeric material;
    at least two seats each having openings therein, the openings each comprising:
    a mouth at a first end of the openings;
    a base at a second end of the openings opposite the first end being of a size not greater than the size of the mouth end and defining a contact surface surrounding the said openings; and walls with cross-sections that do not increase from the mouth to the base; and at least one metal insert that has a widened head portion, and engages with the contact surface surrounding the openings;

wherein the seats and the metal inserts are mechanically coupled using coupling surfaces on the seats and metal inserts that are cylindrically shaped and the coupling surface of the seats has, in at least one portion thereof, an inner threading defining a threaded hole; and wherein the body is adapted to mechanically couple with at least one element of a bicycle to transmit force and the body has a circular contact surface extending above a surface of the body and the widened head portion of the at least one metal insert abuts against the circular contact surface.

* * * * *